United States Patent [19]
Chapman

[11] Patent Number: 6,086,207
[45] Date of Patent: Jul. 11, 2000

[54] CAMERA LEVELING HEAD

[75] Inventor: Leonard T. Chapman, North Hollywood, Calif.

[73] Assignee: Chapman/Leonard Studio Equipment, North Hollywood, Calif.

[21] Appl. No.: 09/207,492

[22] Filed: Dec. 8, 1998

[51] Int. Cl.[7] .............................. G03B 17/00; F16M 11/04
[52] U.S. Cl. .................. 352/243; 248/178.1; 248/187.1; 396/428
[58] Field of Search .......................... 352/243, 90, 244; 348/373–375; 396/428, 12, 13, 419, 421; 248/176.1–183.1, 183.2, 183.3, 185.1, 184.1, 187.1, 176.3, 138, 139, 371, 398, 567, 583, 133, 913, 923, 595, 214

[56] References Cited

U.S. PATENT DOCUMENTS

| | | | |
|---|---|---|---|
| 2,136,035 | 11/1938 | Altemus et al. | 248/181.1 |
| 3,752,429 | 8/1973 | Reed | 248/179.1 |
| 4,075,891 | 2/1978 | Roberts | 73/483 |
| 4,113,215 | 9/1978 | Stapleton | 248/183.3 |
| 4,360,187 | 11/1982 | Chapman | 254/8 R |
| 4,557,459 | 12/1985 | Lindsay | 248/571 |
| 4,732,357 | 3/1988 | Lindsay | 248/183.2 |
| 4,821,106 | 4/1989 | Fikota et al. | 348/373 |
| 4,989,823 | 2/1991 | Chapman | 248/638 |
| 5,202,712 | 4/1993 | Fitz et al. | 396/428 |
| 5,312,121 | 5/1994 | Chapman | 280/47.11 |
| 5,466,078 | 11/1995 | Szmanda et al. | 400/489 |
| 5,669,594 | 9/1997 | Platus et al. | 248/619 |
| 5,816,552 | 10/1998 | Chapman | 248/281.11 |
| 5,901,612 | 5/1999 | Letovsky | 74/471 XY |

OTHER PUBLICATIONS

Brochure "Chapman" Universal Head Leveling Procedure, Chapman/Leonard Studio Equipment, Rev. Jan. 9, 1997, 3 pages.
Brochure "The Vibration Isolator" By Chapman, Leonard Studio Equipment, Inc., 1989, 2 pages.

*Primary Examiner*—Alan A. Mathews
*Assistant Examiner*—Rodney Fuller
*Attorney, Agent, or Firm*—Lyon & Lyon LLP

[57] ABSTRACT

A leveling head for a camera has four jacking screws attached to a base plate. A ring is pivotably attached to a hub on the base plate. A top plate is pivotably attached to the ring and supported on the jacking screws. The top plate can pivot along two perpendicular axes relative to the base plate, to provide a level mounting surface for a camera. A spring on the base plate pushes the top plate upwardly, to partially counterbalance the weight of the camera, to reduce the turning force needed on the jacking screws.

15 Claims, 7 Drawing Sheets

CAMERA LEVELING HEAD

BACKGROUND OF THE INVENTION

The field of the invention is leveling heads for cameras. More particularly, the invention relates to a leveling head of the type supported on a camera dolly or pedestal for leveling or otherwise positioning a motion picture or television camera.

During the filming of motion pictures or television programs, the camera must often moved into different positions, to achieve a desired camera angle. Ordinarily, the camera and camera lens is positioned in a level orientation. For certain filming sequences, it is advantageous to be able to use the leveling head to change the elevation angle, or the panning or azimuth angle of the camera. Preferably, the changes in the camera position provided by the leveling head should be able to be made quickly and reliably, and optionally without tools, so that production of the motion picture or television program is not unduly delayed. While other leveling heads have been used with varying degrees of success, it is an object of the invention to provide an improved leveling head for a camera.

SUMMARY OF THE INVENTION

To this end, a leveling head for a camera includes jacking screws attached to a base plate. A ring is pivotably attached to a hub on the base plate, and pivots on a ring axis. A top plate is pivotably attached to the ring, and supported on the jacking screws. The top plate pivots on a top plate axis which is preferably perpendicular to the ring axis. The camera is leveled by turning the jacking screws.

In a second and separate aspect of the invention, a spring pushes the top plate away from the base plate, to partially counterbalance the weight of the camera, so that the jacking screws can be turned without excessive force.

In a third and separate aspect of the invention, a plurality of indexing holes are provided in the base plate, so that the entire leveling head, which is supported on a platform, on a camera dolly or pedestal, can be panned, to various incremental angular positions, and then be locked into position.

BRIEF DESCRIPTION OF THE DRAWINGS

Other objects and features of the invention will become apparent from the following detailed description taken in connection with the accompanying drawings. It should be understood, however, that the drawings are designed for the purpose of illustration only, and are not intended as a definition of the limits of the invention. In the drawings, wherein the same reference number denotes the same element throughout the several views:

FIG. 6 is a side view of a second embodiment of the present leveling head;

DETAILED DESCRIPTION OF THE DRAWINGS

Figure 1:
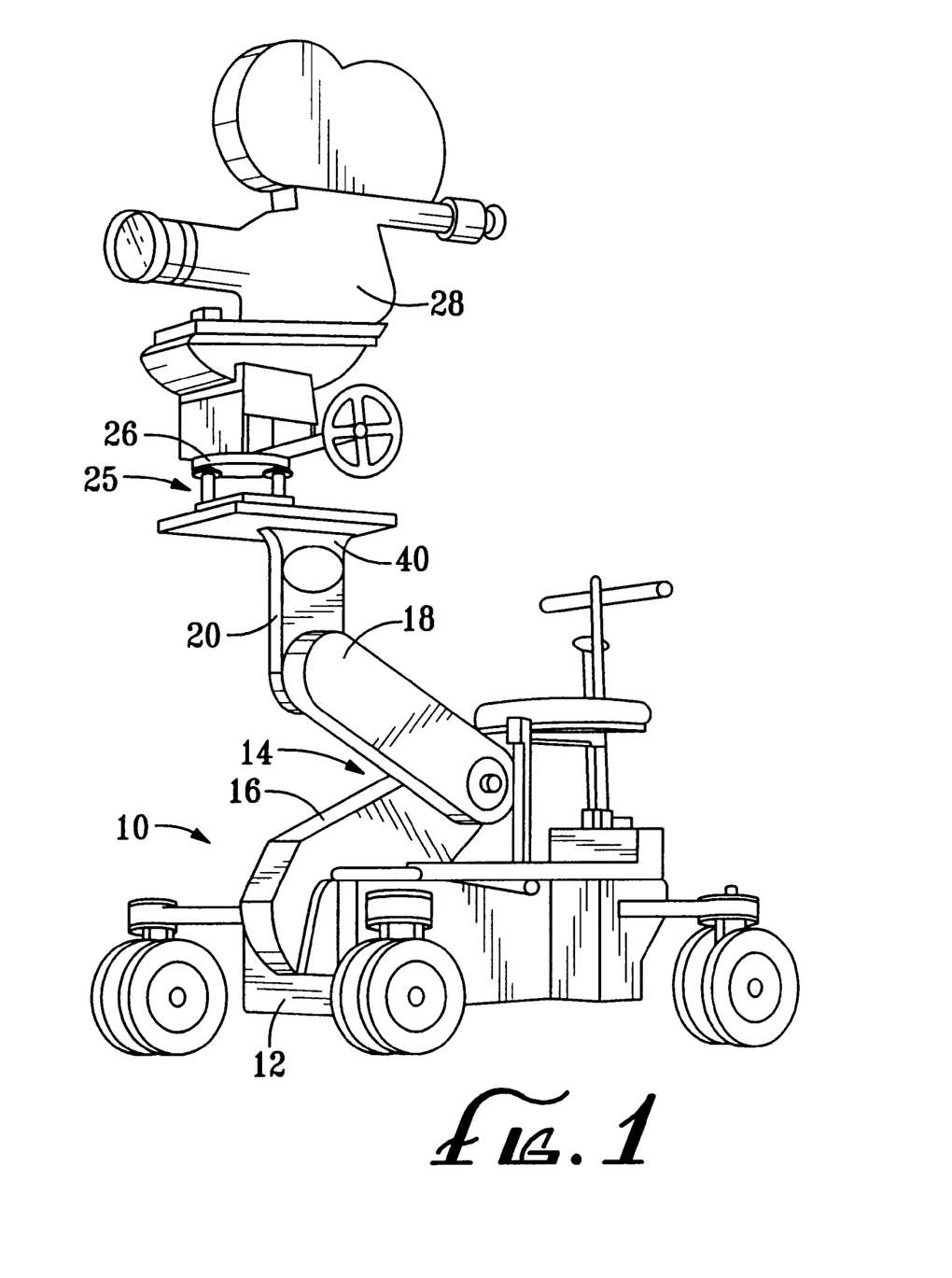
FIG. 1 is a perspective view of the leveling head mounted on a camera dolly.

Turning now in detail to the drawings, as shown in FIG. 1, a camera dolly 10 has an arm 14 pivotably attached to a chassis 12. The arm has a second arm section 18 supported on a first arm section 16. In turn, a third arm section or arm extension 20 is attached to the second arm section 18, as described, for example, in U.S. Pat. Nos. 4,360,187 and 5,816,552, incorporated herein by reference. A platform 40 attached to the arm extension 20 supports a camera leveling head 25. A camera 28 is mounted on a camera mounting plate 26 on the leveling head 25.

Referring to FIGS. 2A, 2B, 3A and 3B, the extension 20 has a lower disk 30 joined to an upper disk 32 via leveling rods 34 and supported on side plates 35, as described in U.S. Pat. No. 5,816,552. The disks 30 and 32 and leveling rods 34 work in cooperation with the a leveling system in the first arm section 16 and second arm section 18, as described in U.S. Pat. No. 4,360,187, to maintain the platform 40 in an upright, or otherwise fixed orientation, as the arm 14 moves up and down to change the camera lens height. A bolt lever 38 is attached to a through bolt 36 passing through the upper disk 32, for tightening the platform 40 into position relative to the arm extension 20.

Figures 2A, 4A:
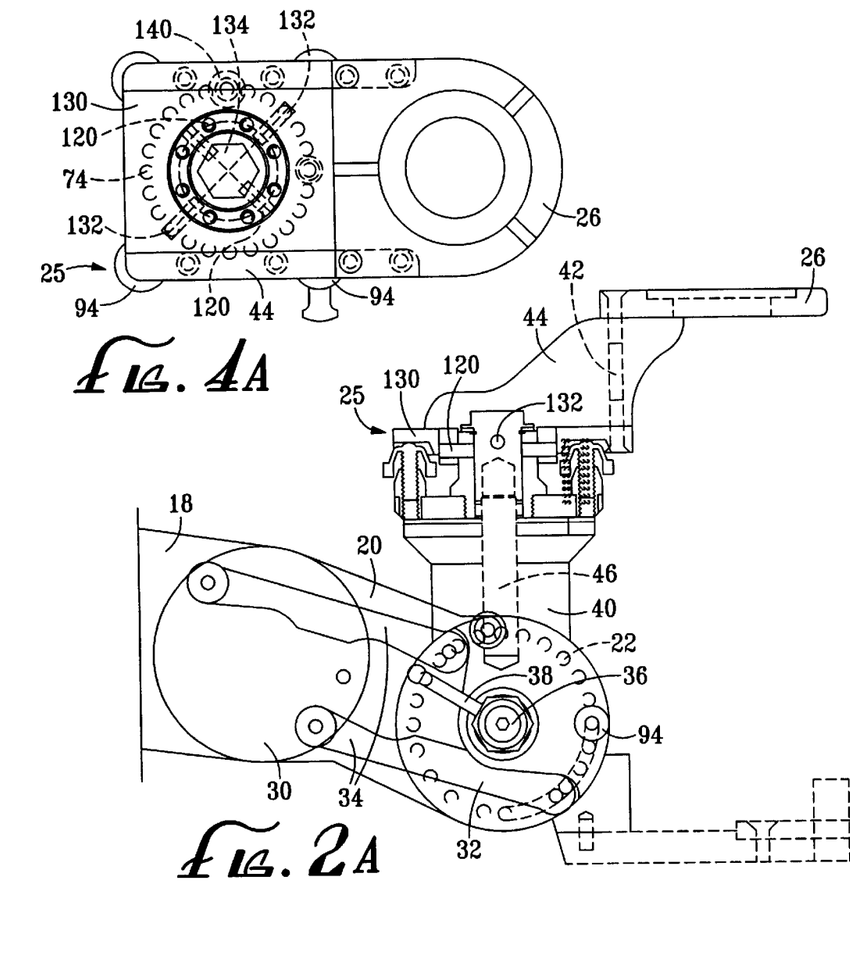
FIG. 2A is a side view thereof.
FIG. 4A is a top view of the leveling head shown in FIG. 2A.
Figure 2B:
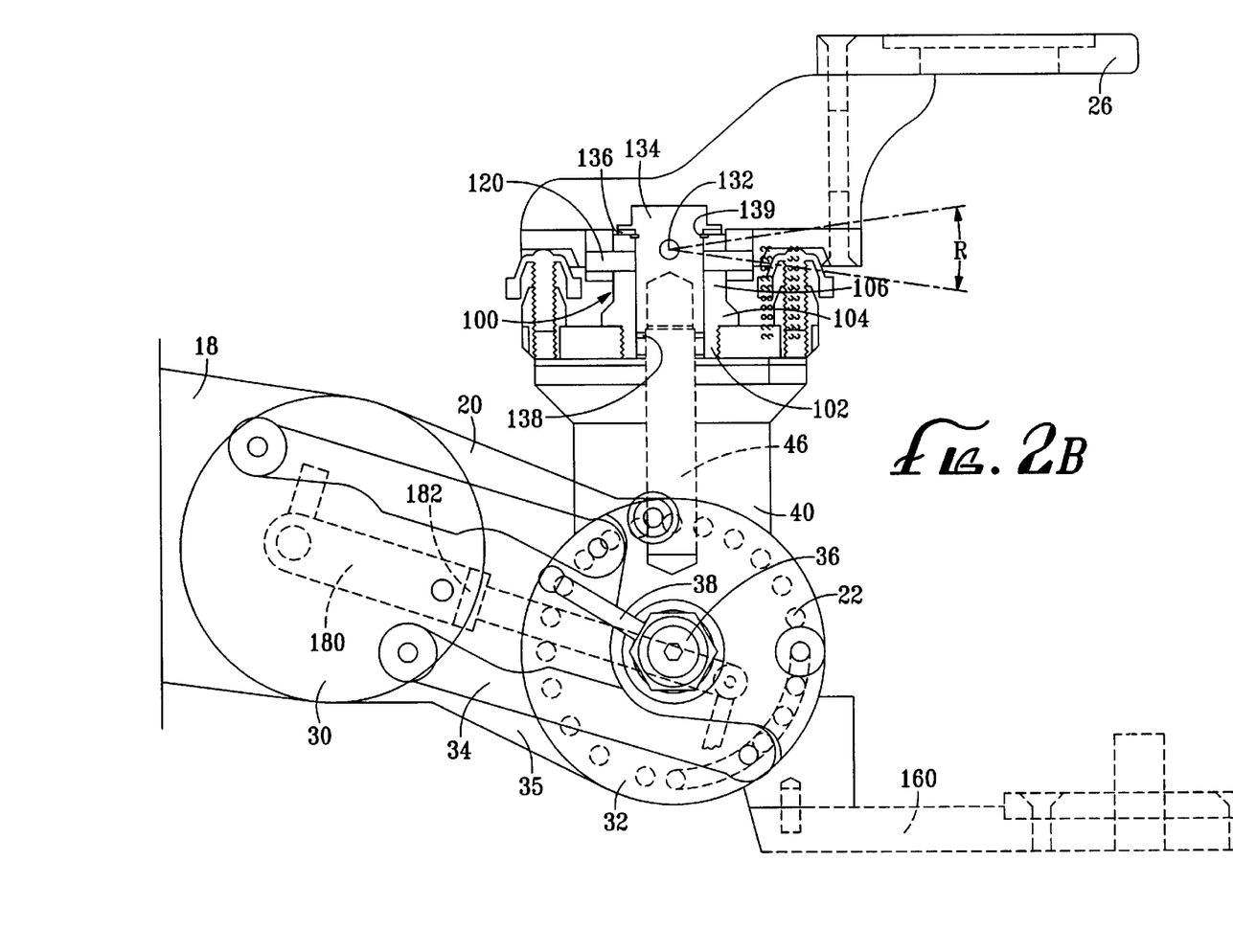
FIG. 2B is an enlarged view of the leveling head shown in FIG. 2A.
Figure 3A:
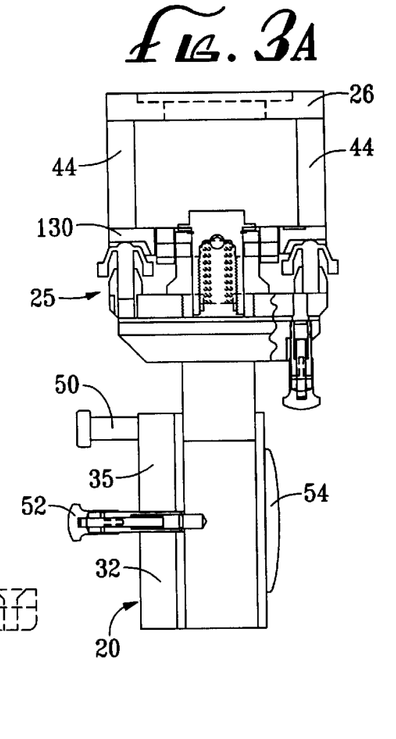
FIG. 3A is an end view of the leveling head shown in FIG. 2A, in part section, with the hub shown rotated 45° for purposes of illustration.
Figure 3B:
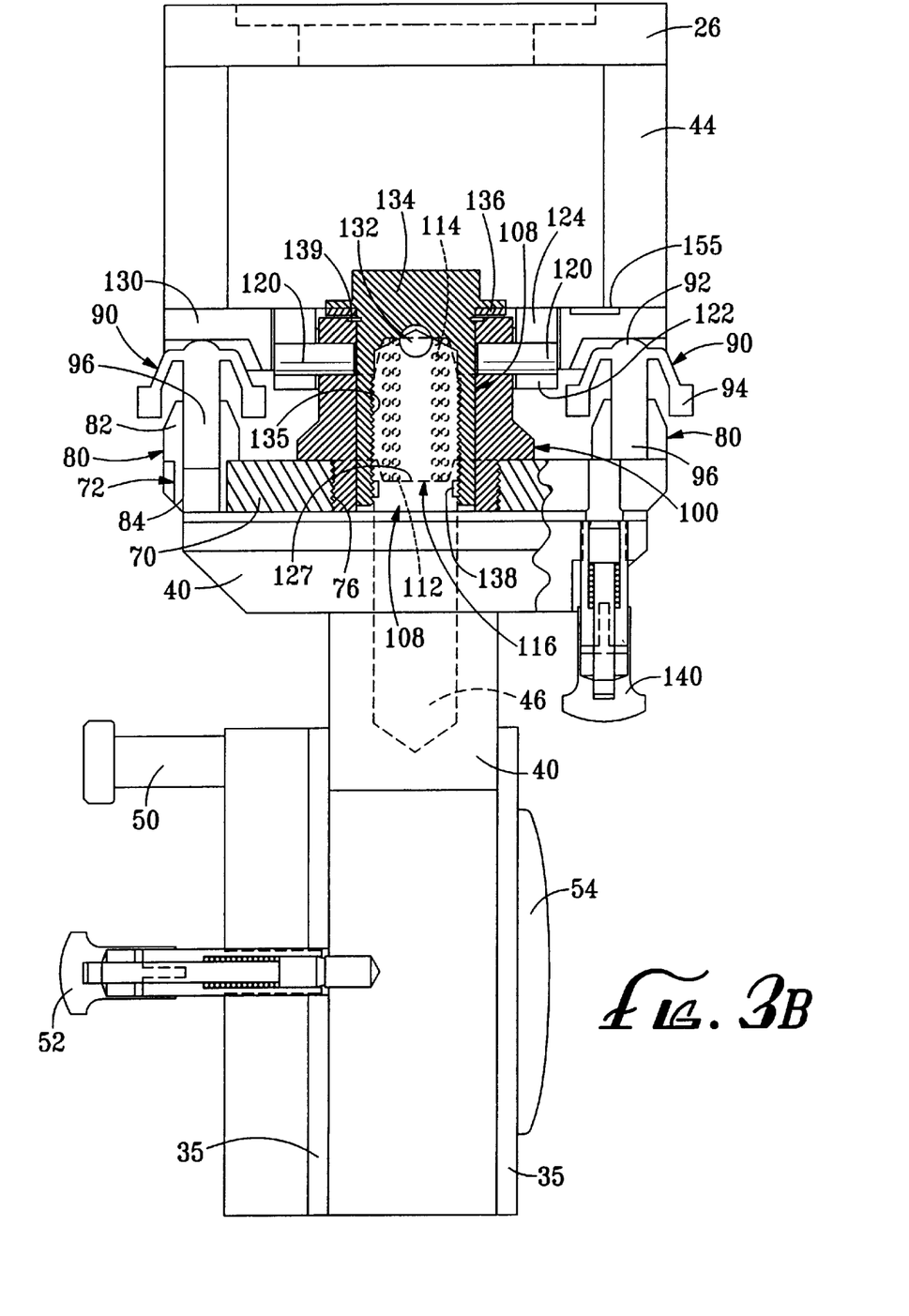
FIG. 3B is an enlarged view of the leveling head as shown in FIG. 3A.
Figure 5:
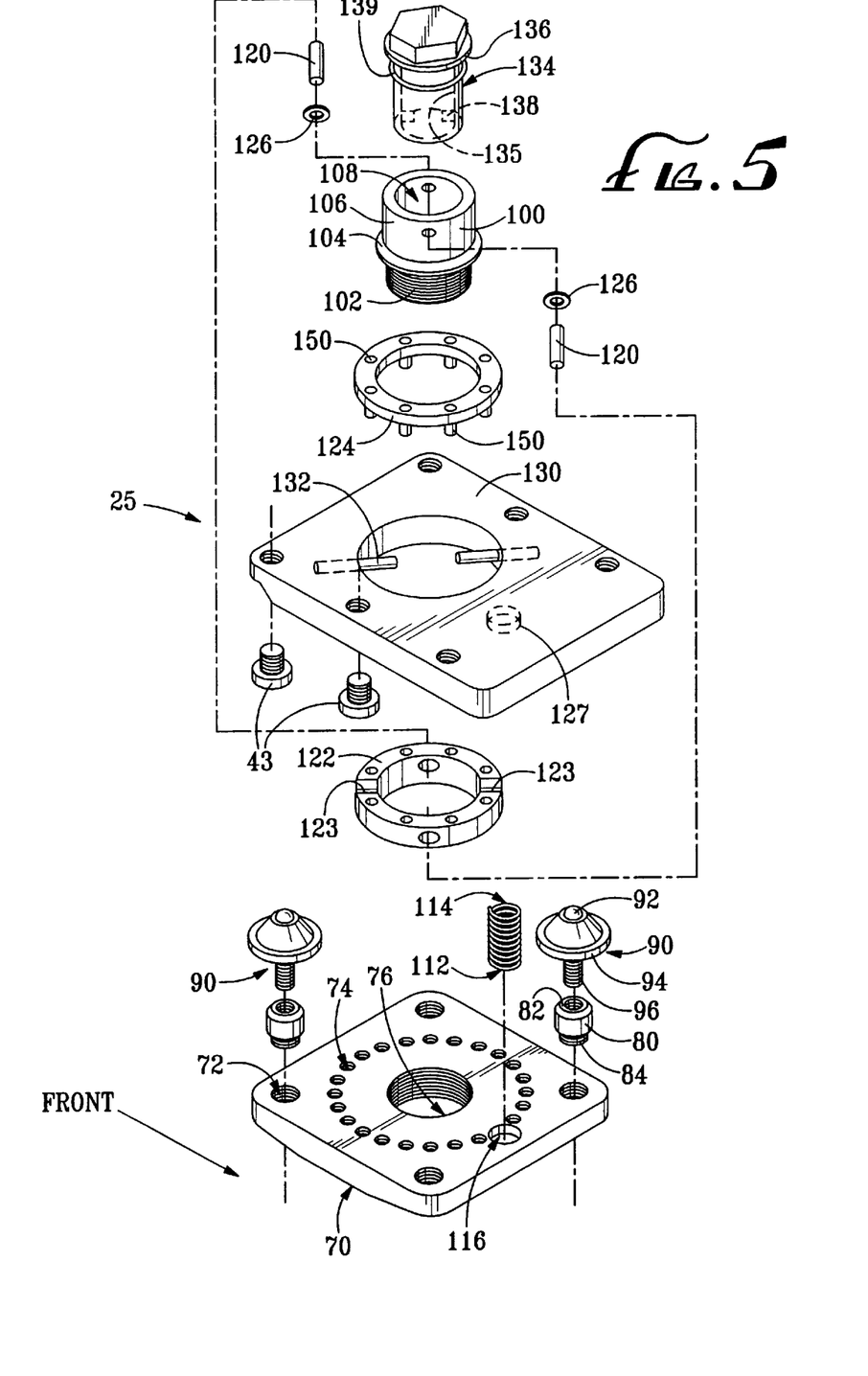
FIG. 5 is an exploded perspective view of the leveling head shown in FIG. 1, with the gussets, front plate, and camera mounting plate omitted for clarity of illustration.

Referring now to FIGS. 2B, 3B and 5, the leveling head 25 includes a base plate 70 which is positioned on top of the platform 40. Gusset plates 44 are attached to the base plate 70 and firmly support the camera mounting plate 26.

Referring specifically to FIG. 5, four equally spaced ferrules 80 are attached to the base plate 70. Preferably, as shown in FIG. 5, the ferrules have a conical top end 82, and a threaded bottom end 84 which secures the ferrules 80 into the ferrule holes 72 in the base plate 70. A thumb screw 90 is threaded into each ferrule 80. (For clarity of illustration, only two of the thumb screws 90 are shown in FIG. 5.) The thumb screws 90 have a spherical or dome-shaped top 92, a wheel section 94 and a threaded bottom end 96 which is threaded into the ferrule 80.

Referring still to FIG. 5, a threaded center hole 76 is centrally positioned between the ferrule holes 72. Pan angle indexing holes 74 are provided in a circle concentric to the center hole 76. Preferably, the indexing holes 74 are at 15° intervals.

A hub 100 has a threaded lower end 102, a shoulder flange 104, an upper cylindrical body section 106, and a through center bore 108. The lower end 102 of the hub 100 is threaded into the center hole 76, to secure the hub 100 to the base plate 70.

Continuing to refer to FIG. 5, hub pins 120 extend through a bottom ring 122 and are pressed into holes in the cylindrical body section 106 of the hub 100. The clearance holes provided in the bottom ring 122 for the hub pins 120 are large enough to allow the bottom ring 122 to freely pivot on the fixed hub pins 120 relative to the hub 100. Teflon washers 126 are placed over the hub pins 120 in between the cylindrical body section 106 of the hub 100 and the inside surface of the bottom ring 122, to reduce pivoting movement friction. The hub 100 is threaded into and permanently attached to the plate 70. The hub pin holes are then drilled and the hub pins 120 installed, with the fixed orientation shown in FIG. 5. Gusset plates 44 are attached to the top plate 130 via bolts 43 and firmly support the camera mounting plate 26. A front plate 42 extends between the gusset plates 44.

Figure 4B:
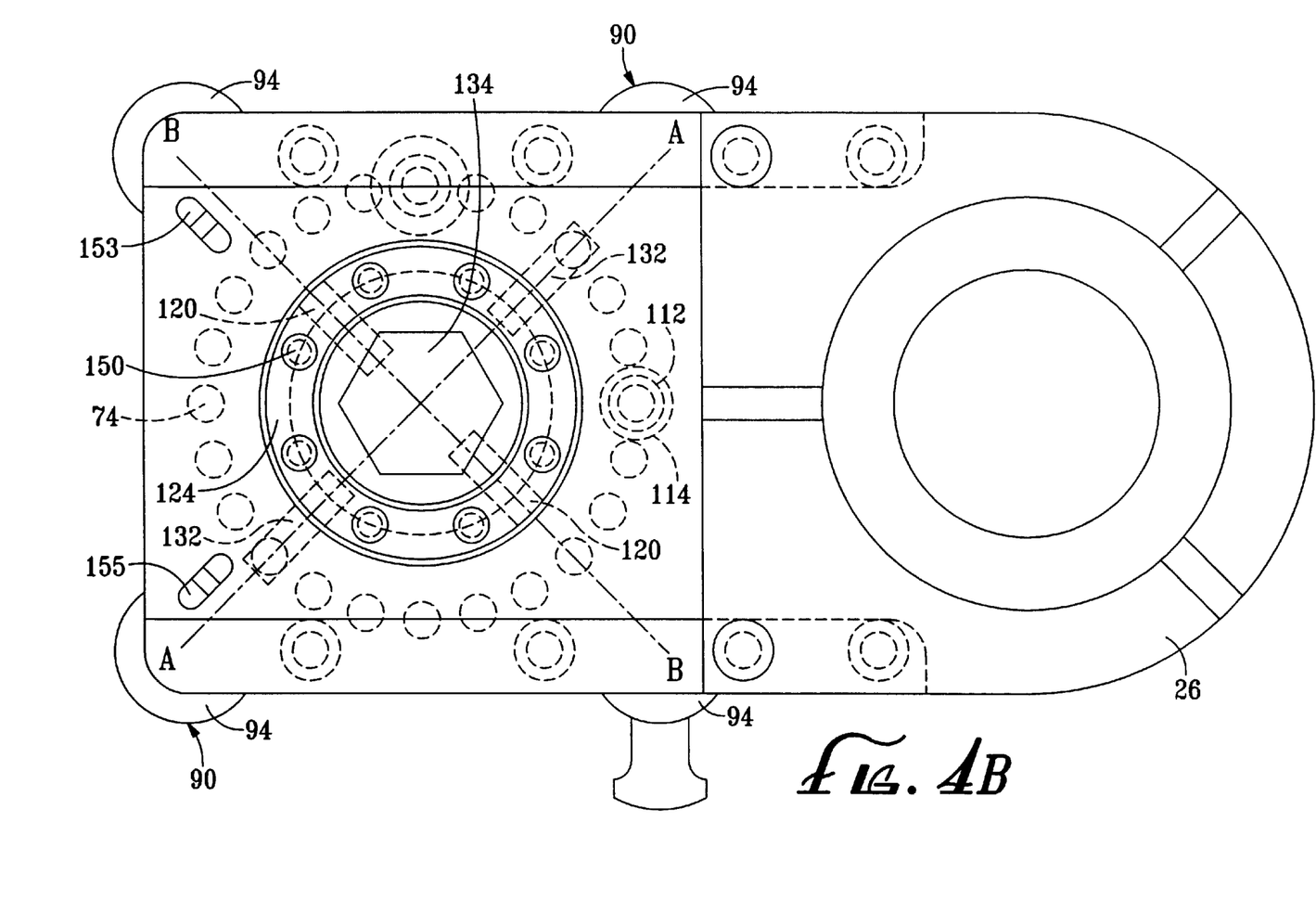
FIG. 4B is an enlarged view thereof.

Top plate pins 132 are pressed or inserted into a top plate 130, and are oriented at right angles to the hub pins 120. The top plate pins 132 rest in pin grooves 123 in the top surface of the bottom ring 122. A top ring 124, having corresponding semi-circular pin grooves 123 is attached to the bottom ring 122 via cap screws 150. Consequently, the top plate 130 is captive onto the bottom ring 122. However, the top plate 130 can pivot relative to the bottom ring 122 via the top plate pins 132. As a result, the top plate 130 can pivot in four directions, along the axes A—A and B—B as shown in FIG. 4B, in a "universal joint" type of movement.

Referring now to FIGS. 3B and 5, a cap nut 134 having a threaded interior bore 135 extends through the center bore 108 of the hub 100, through the top ring 124, bottom ring 122, top plate 130, base plate 70, and is threaded onto a threaded post 46 (shown in FIG. 3B) secured into the platform 40. A thrust bearing 136 under the head of the cap nut 134 is held in place by a snap ring 139. The thrust bearing 136 reduces friction between the underside of the head of the cap nut 134 and the top surface of the hub 100, so that the cap nut may be tightened, without moving the hub 100. A "Nylock" or other thread fastening device 138 is provided in the threaded interior bore 135, to prevent the cap nut 134 from inadvertently turning on the threaded post 46 and loosening, when the entire leveling head 25 turns, to pan the camera.

Referring still to FIGS. 3B and 5, an outer compression spring 114 surrounding an inner compression spring 112 are positioned in between the base plate 70 and top plate 130. A spring cup 116 in the base plate 70 holds the lower end of the springs 112 and 114 in position. Similarly, a spring cup 127 on the underside of the top plate 130 positions and secures the top ends of the springs. A single spring may be used in place of the two spring design shown in the drawings.

As shown in FIG. 3B, a position selector bolt 50 extends through the upper disk 32 in the arm extension 20, to select the position of the platform 40. A spring loaded indexing pin 52 also extends through the upper disk 32 on the arm extension 20, to index the platform 40 and leveling head 25, i.e., by incrementally changing the elevation angle of the platform 40, as described in U.S. Pat. No. 5,816,552. The through bolt 36 extends through the arm extension 20 and engages a side a cap 54 on the opposite side. The selector bolt extends through a selected hole in the upper disk and threads into the left side plate 35, to lock the upper disk 32 to the side plate 35, and thereby select one of four arm extension positions, as described in U.S. Pat. No. 5,816,552. The selector bolt 50 does not go into the hub 100. As a result, the hub 100, unlike the upper disk 32, is not locked in position with the side plate 35. Releasing the index pin 52 therefore allows the platform 40 to pivot or index to a desired angle.

As shown in FIG. 3B, a spring loaded panning lock pin 140 extends up through the platform 40 and engages one of the selected azimuth indexing holes 74 in the base plate 70, to select and secure a panning or azimuth angle.

As shown in FIG. 2B, a drop down plate 160 may optionally be attached to the arm extension 20 to achieve very low camera lens height. The leveling head 25, if desired, can be attached to the drop down plate 160. Referring to FIG. 2B, a dampening element 180 may be attached between the leveling rods 34 to limit the fall or drop away speed of movement of the extension 20. The dampening element 180, preferably a hydraulic dampener, advantageously has a 1-way valve 182, so that dampening is provided only for downward movement. This avoids increasing the time and lifting force needed to raise up the extension 20.

In use, a camera 28 is attached to the camera mounting plate 26. The camera 28 is significantly offset forwardly from the center of the leveling head 25. Consequently, as the panning angle of the leveling head 25 is changed, the camera moves from side to side, on a circle about the vertical axis of the threaded post 46. This allows the camera to be positioned further off to one side (e.g., closer to a wall) than would otherwise be achievable on a dolly or pedestal.

The springs 112 and 114 preferably exert an upward force on the top plate 130 of about 50–70 pounds, which is typically about one-half of the weight of a camera. The upward force exerted by the springs partially counterbalances the weight of the camera, so that the thumb screws 90 can be easily turned by hand, without excessive torque.

Bubble levels 155 are provided on or in the top plate 130, at right angles to each other, and oriented parallel to the A—A and B—B axes. The camera mounting plate 26 and camera 28 may be leveled by using the site or bubble levels 155 and turning the thumb screws 90.

The leveling head 25 provides an angular leveling range R, as shown in FIG. 2B, preferably of about plus or minus 8° along each axis. For greater movement, the platform 40 is indexed on the arm extension 20 to the most level position available, using the elevation indexing holes 22 on the arm extension 20. The elevation indexing holes 22 are preferably also angularly spaced all around by 15°. With this hole spacing, the elevation indexing holes 22 will level the platform 40 to within a maximum out of level condition of 7°. To bring the camera platform 26 into a completely level position, the thumb screws 90, which can shift the camera mounting plate 26 by plus or minus 8°, are then used to achieve a completely level position.

To change the panning angle, the panning lock pin 140 is pulled down and the leveling head 25 turned to the desired position. The pin 140 is then released and engages a panning indexing hole 74 in the base plate 70. The 15° angular increments of the panning indexing holes 74 are generally sufficient to achieve most desired panning camera angles. Additional angular movement can be achieved by moving the dolly or pedestal, or via a pan or tilt head positioned between the camera 28 and the camera mounting plate 26. If desired, the angular intervals could be reduced below 15°.

Figure 7:
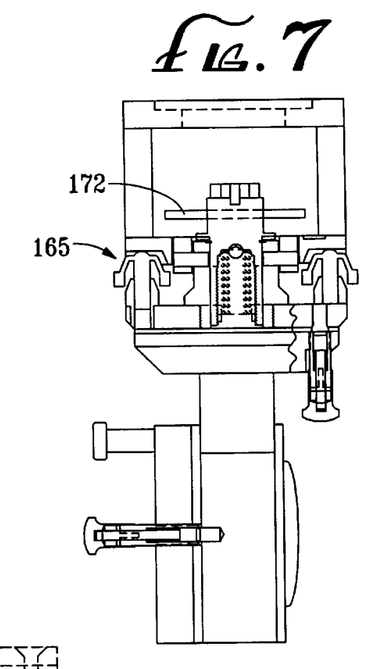
FIG. 7 is a front view thereof.
Figures 8, 9:
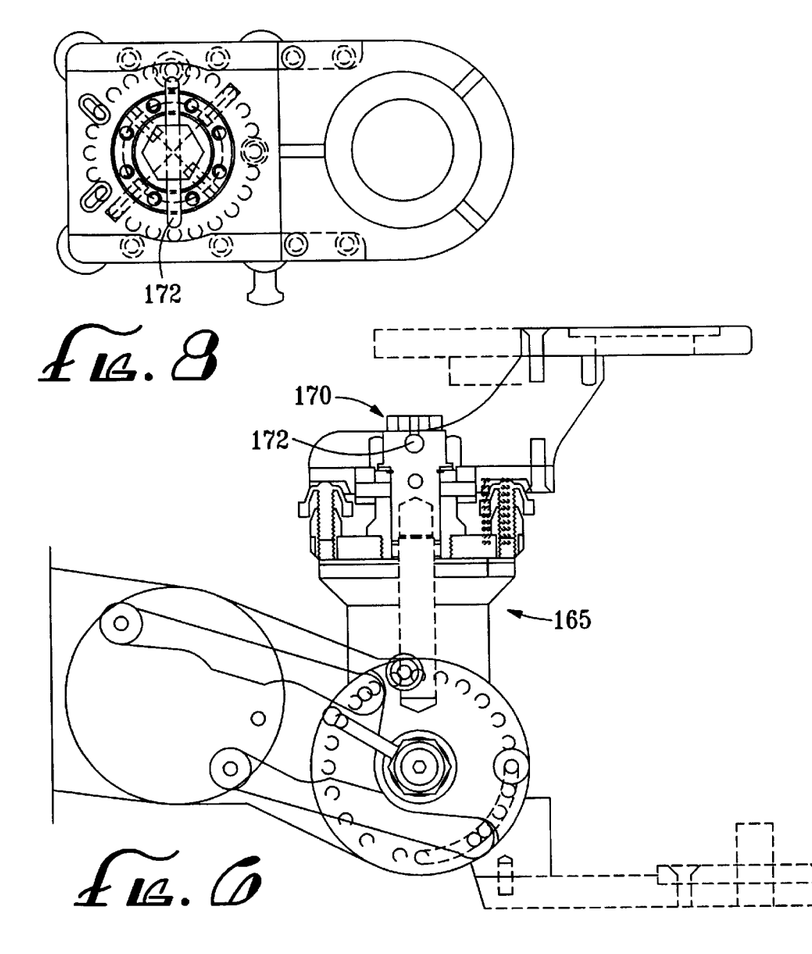
FIG. 8 is a top view thereof.

In a second embodiment, as shown in FIGS. 6–8, a cap nut 170 has a cap nut handle 172, which allows the cap nut 170 to be tightened by hand. This allows the leveling head 165 to be quickly mounted onto the platform 40, without using tools.

In both embodiments, the leveling head is very light weight, yet rigid. As the camera mounting plate 26 is offset, the bottom of the plate 26 is open, making it fast and easy to attach a camera onto the plate (by threading a large nut onto a camera mounting stud extending through the plate 26. The present leveling head also provides sufficient clearance, via selection of the height of the platform 40, to avoid creating pinch points, when the head 25 is in a low position, close to the legs or chassis of a camera dolly.

Thus, a novel camera leveling head has been shown and described. Various changes and modifications may of course be made without departing from the spirit and scope of the invention. The invention, therefore, should not be limited, except by the following claims, and their equivalents.

I claim:

1. A leveling head for a camera comprising:

a base plate;

a plurality of jacking screws attached to the base plate;

a hub attached to the base plate;

a ring pivotably attached to the hub; and a top plate pivotably attached to the ring and supported on the jacking screws.

2. The leveling head of claim 1 further comprising a cap nut extending through a bore in the hub and engaged onto a post extending up through the base plate.

3. The leveling head of claim 1 further comprising a first set of pins pivotably attaching the ring to the hub and a second set of pins pivotably attaching the top plate to the ring.

4. The leveling head of claim 3 wherein the first set on pins are oriented perpendicular to the second set of pins.

5. The leveling head of claim 1 further comprising a spring between the base plate and the top plate and urging the top plate away from the base plate.

6. The leveling head of claim 3 wherein the ring has a top section and a bottom section, and wherein the second set of pins is clamped between the top section and the bottom section of the ring.

7. The leveling head of claim 1 further comprising a plurality of indexing openings in the base plate.

8. The leveling head of claim 4 further comprising a front plate attached to the top plate and wherein the first and second sets of pins lie on lines intersecting the front plate at an angle of from 40 to 50 degrees.

9. A camera dolly comprising:

a camera dolly arm;

an arm extension attached to the dolly arm;

a platform pivotably attached to the arm extension; and a leveling head attached to the platform, the leveling head including:
  a base plate having a central opening;
  a hub attached to the base plate and having a hub opening aligned over the central opening in the base plate;
  a ring pivotably attached to the hub;
  a top plate pivotably attached to the ring;
  a compression spring between the top plate and base plate; and
  a plurality of jack screws on the base plate at least partially supporting the top plate.

10. The camera dolly of claim 9 further comprising a front plate attached to the top plate and a camera mounting plate attached to the front plate.

11. The camera dolly of claim 9 further comprising means for selecting an elevation angle of the platform and for locking the platform in position relative to the arm extension.

12. A camera dolly comprising:

a chassis;

an arm supported on the chassis;

an arm extension attached to the dolly arm;

a platform pivotably attached to the arm extension;

a leveling head attached to the platform, the leveling head including:
  a base plate having a central opening;
  a top plate pivotably supported over the base plate;
  a plurality of jack screws on the base plate at least partially supporting the top plate; and
  the platform positioning the leveling head to prevent the leveling head from contacting the chassis, regardless of the position of the arm.

13. The camera dolly of claim 12 further comprising legs pivotably attached to the chassis, and the platform positioning the leveling head to prevent the leveling head from contacting the legs.

14. The leveling head of claim 2 wherein the cap nut is tubular and has a lower end threaded into the base plate, and an upper end having pins extending therethrough, into the ring.

15. A leveling head for a camera, comprising:

a base plate;

a plurality of jacking screws threaded into the base plate;

a tubular hub having a lower end attached to the base plate;

a ring surrounding the hub;

a pair of hub pivot pins extending radially outwardly from the tubular hub and into the ring, to pivotably attach the ring to the hub;

a top plate having a central opening, with the ring positioned within the central opening; and a pair of plate pivot pins attached to the top plate and extending radially inwardly into the central opening, to pivotably attach the ring to the top plate.

* * * * *